United States Patent
Banno

(10) Patent No.: US 6,967,180 B2
(45) Date of Patent: *Nov. 22, 2005

(54) DIELECTRIC CERAMIC COMPOSITION AND CERAMIC ELECTRONIC COMPONENT

(75) Inventor: Koichi Banno, Shiga-ken (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/859,544

(22) Filed: Jun. 3, 2004

(65) Prior Publication Data

US 2005/0020433 A1 Jan. 27, 2005

(30) Foreign Application Priority Data

Jul. 24, 2003 (JP) ........................................ 2003-201279

(51) Int. Cl.$^7$ ................................................. C04B 35/47
(52) U.S. Cl. ...................... 501/136; 428/210; 428/710
(58) Field of Search ........................... 501/136; 428/210, 428/702

(56) References Cited

U.S. PATENT DOCUMENTS 4,482,934 A * 11/1984 Hirota et al. ............. 361/321.5
4,746,639 A   5/1988 Sano et al.
2003/0137797 A1  7/2003 Kimoto et al.

FOREIGN PATENT DOCUMENTS

| JP | 1987-187556 | 11/1985 |
| JP | 3-274606 | 12/1991 |
| JP | 4-264307 | 9/1992 |

OTHER PUBLICATIONS

European Search Report issued Oct. 28, 2004.

* cited by examiner

Primary Examiner—Karl Group
(74) Attorney, Agent, or Firm—Dickstein, Shapiro, Morin & Oshinsky, LLP.

(57) ABSTRACT

A dielectric ceramic composition contains 100 parts by weight of a primary component represented by $a[(Sr_bCa_{1-b})TiO_3]\text{-}(1-a)[Bi_2O_3 \cdot nTiO_2]$ wherein a and b are moles and n is the molar ratio of $TiO_2$ to $Bi_2O_3$; w parts by weight of $MgTiO_3$; x parts by weight of $SiO_2$; y parts by weight of $MnO_m$ ($MnCO_3$ equivalent); and z parts by weight of $LnO_k$, wherein m is 1 to 2; Ln is at least one of lanthanum, cerium, praseodymium, neodymium, samarium, europium, gadolinium, dysprosium, holmium and erbium; and k is in the range of 1.5 to 2 such that $LnO_k$ is electroneutral, wherein a, b, n, w, x, y and z satisfy the relationships $0.90 \leq a \leq 0.95$, $0.90 \leq b \leq 0.95$, $1.8 \leq n \leq 3.0$, $5.0 \leq w \leq 10.0$, $0.1 \leq x \leq 1.0$, $0.1 \leq y \leq 0.3$, and $1.0 \leq z \leq 5.0$.

12 Claims, 1 Drawing Sheet

DIELECTRIC CERAMIC COMPOSITION AND CERAMIC ELECTRONIC COMPONENT

BACKGROUND OF THE INVENTION

1. Field of the Invention

The present invention relates to dielectric ceramic compositions and, in particular, to a dielectric ceramic composition exhibiting a high dielectric constant. It also relates to a ceramic electronic component made using the dielectric ceramic composition.

2. Description of the Related Art $BaTiO_3$ ceramics have been widely used as high-dielectric-constant ceramic compositions. However, $BaTiO_3$ ceramics exhibit low Q values at high frequencies, i.e., 1 MHz or greater. To overcome this problem, Japanese Unexamined Patent Application Publication No. 62-295304 teaches a $SrTiO_3$—$MgTiO_3$—$CaTiO_3$—$Bi_2O_3$—$TiO_2$—$CuO$—$MnO$—$CeO_2$ ceramic composition. Although this composition has a high dielectric constant $\in$ and high Q at frequencies of 1 MHz or more and shows little change in dielectric constant with respect to temperature change, the volume resistivity is only $10^{12}$ to $10^{13}$ $\Omega \cdot cm$, which is not sufficiently high.

SUMMARY OF THE INVENTION

An object of the present invention is to provide a dielectric ceramic composition having a high dielectric constant $\in$ and a Q value of at least about 1,000 at frequencies of 1 MHz or more, which undergoes little change in dielectric constant with respect to temperature changes and exhibits high volume resistivity. Another object of the present invention is to provide an electronic component made using the dielectric ceramic composition.

A first aspect of the present invention provides a dielectric ceramic composition containing 100 parts by weight of a primary component represented by the general formula $a[(Sr_bCa_{1-b})TiO_3]\text{-}(1-a)[Bi_2O_3 \cdot nTiO_2]$ wherein a and b are each moles and n is the molar ratio of $TiO_2$ to $Bi_2O_3$; w parts by weight of $MgTiO_3$; x parts by weight of $SiO_2$; y parts by weight of $MnO_m$ ($MnCO_3$ equivalent); and z parts by weight of $LnO_k$, wherein m is 1 to 2; Ln is at least one of lanthanum, cerium, praseodymium, neodymium, samarium, europium, gadolinium, dysprosium, holmium and erbium; and k is in the range of 1.5 to 2 so that $LnO_k$ becomes electroneutral, and wherein a, b, n, w, x, y and z satisfy the following conditions:

$0.90 \leq a \leq 0.95$, $0.90 \leq b \leq 0.95$, $1.8 \leq n \leq 3.0$, $5.0 \leq w \leq 10.0$, $0.1 \leq x \leq 1.0$, $0.1 \leq y \leq 0.3$, and $1.0 \leq z \leq 5.0$.

A second aspect of the present invention provides a ceramic electronic component including a ceramic sintered compact composed of the above-described dielectric ceramic composition; and an electrode formed on a surface of the ceramic sintered compact.

DESCRIPTION OF THE PREFERRED EMBODIMENTS

Figure 1:
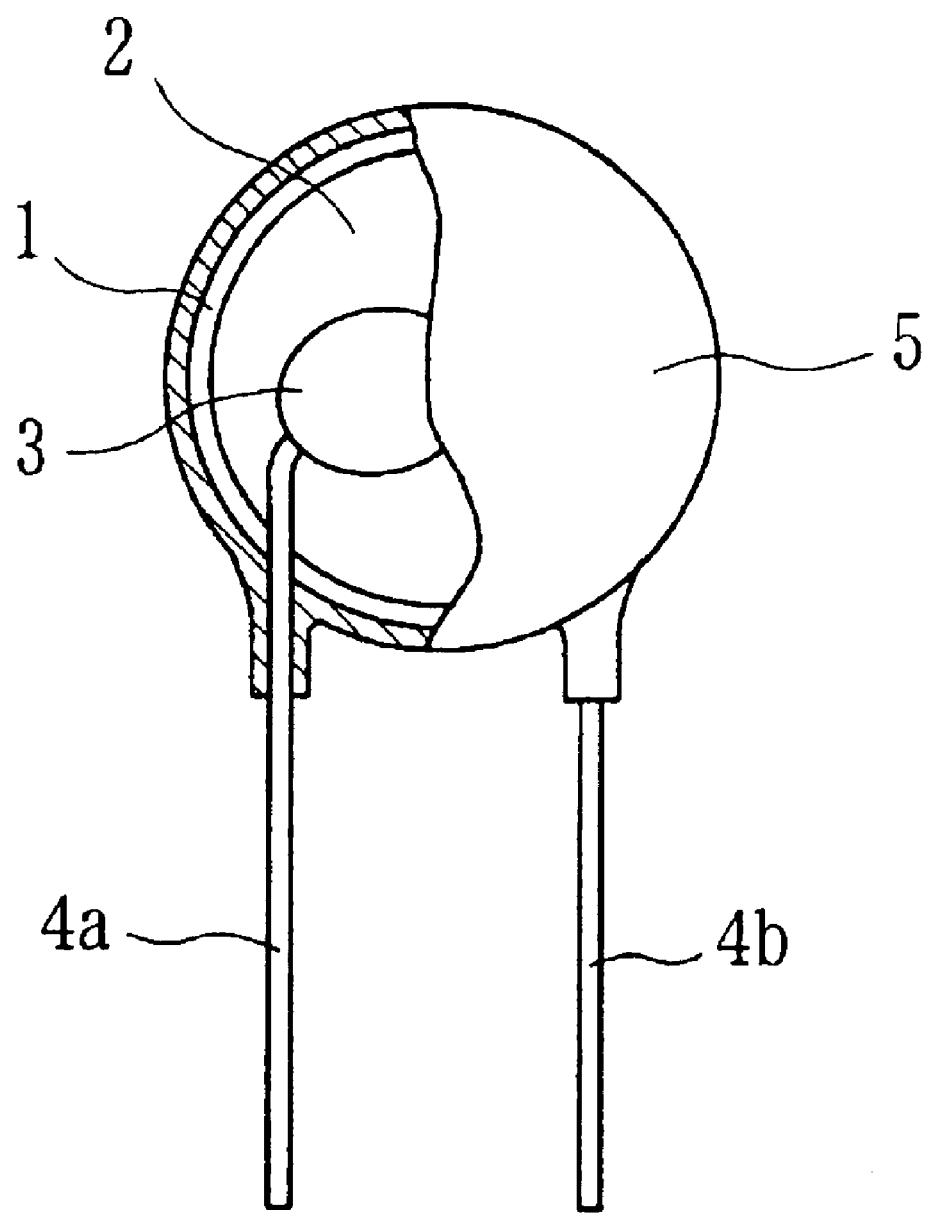
FIG. 1 is a partially cut front view of a single capacitor, i.e., a ceramic electronic component, made using a dielectric ceramic composition according to an embodiment of the present invention.

Preferred embodiments of the present invention will now be described in detail. FIG. 1 is a partially cut front view of a single capacitor, i.e., a ceramic electronic component, according to an embodiment of the present invention. The single capacitor is made from a dielectric ceramic composition of the present invention.

The single capacitor includes a sintered compact 1 composed of the dielectric ceramic composition of the present invention, electrodes 2 formed on both faces of the sintered compact 1, leads 4a and 4b electrically connected to the electrodes 2 via solders 3, and a resin outer covering 5 covering the sintered compact 1.

In this embodiment, the dielectric ceramic composition contains a primary component represented by the general formula $a[(Sr_bCa_{1-b})TiO_3]\text{-}(1-a)[Bi_2O_3 \cdot nTiO_2]$. The dielectric ceramic composition also contains w parts by weight of $MgTiO_3$, x parts by weight of $SiO_2$, y parts by weight of $MnO_m$ ($MnCO_3$ equivalent) and z parts by weight of $LnO_k$ relative to 100 parts by weight of the primary component. In the general formula, a and b are each moles; n is the molar ratio of $TiO_2$ to $Bi_2O_3$; m is 1 to 2; Ln is at least one of lanthanum, cerium, praseodymium, neodymium, samarium, europium, gadolinium, dysprosium, holmium and erbium; and k is in the range of 1.5 to 2 so that $LnO_k$ becomes electroneutral.

In particular, the valency of oxygen is -2, the valency of the lanthanum, praseodymium, neodymium, samarium, europium, gadolinium, dysprosium, holmium, and erbium is +3, and the valency of cerium is +4. Accordingly, when Ln is at least one selected from the elements having a valency of +3, k is 1.5. When Ln is an element having a valency of +4, k is 2. When Ln includes both elements having a valency of +3 and a valency of +4, k is determined based on the ratio of the elements.

The composition is prepared so that a, b, n, w, x, y and z satisfy the following conditions:

$0.90 \leq a \leq 0.95$, $0.90 \leq b \leq 0.95$, $1.8 \leq n \leq 3.0$, $5.0 \leq w \leq 10.0$, $0.1 \leq x \leq 1.0$, $0.1 \leq y \leq 0.3$, and $1.0 \leq z \leq 5.0$.

A capacitor made from this dielectric ceramic composition can exhibit a high dielectric constant, i.e., a dielectric constant $\in$ of at least 500, a Q value of at least about 1,000 at frequencies of 1 MHz or more, a temperature coefficient of -2,000 ppm/° C. or less, and a volume resistivity of $10^{14}$ $\Omega \cdot cm$ or more.

A method for making the single capacitor will now be described.

First, the dielectric ceramic composition is prepared. In particular, $SrCO_3$, $CaCO_3$, $Bi_2O_3$, $TiO_2$, $MgTiO_3$, $SiO_2$, $MnCO_3$ and $LnO_k$ are weighed in compliance with the above-described conditions and are mixed. The mixture and a grinding medium such as zirconia are placed in a pot and the mixture is pulverized by wet-mixing for a predetermined time. The pulverized mixture is dried by evaporation, placed in a zirconia casing, and calcined at about 900° C. to 1,000°

C. for approximately 2 hours. Then the calcined mixture and a binder, such as polyvinyl alcohol, are placed in a pot and are wet-mixed for a predetermined time. The resulting mixture is dried by dehydration, sized, and compressed to form a green compact having a predetermined disk shape. The green compact is baked at about 1,180° C. to 1,280° C. for 2 hours to prepare the sintered compact 1.

A conductive paste mainly composed of silver and the like is applied on both faces of the sintered compact 1 and baked to form the electrodes 2. The leads 4a and 4b are connected to the electrodes 2 via the solders 3. Subsequently, the outer covering 5 is formed by resin molding to prepare the capacitor.

According to this method, a single capacitor having a high dielectric constant $\in$ and a Q value of at least about 1,000 at frequencies of 1 MHz or more, which undergoes little change in dielectric constant with respect to temperature changes and exhibits high volume resistivity can be easily fabricated.

The present invention is not limited to the embodiments described above. For example, the starting materials of the dielectric ceramic composition may be titanate compounds, such as $SrTiO_3$ or $CaTiO_3$, instead of $TiO_2$ and a carbonate, such as $SrCO_3$ or $CaCO_3$.

The dielectric ceramic composition may be used in making other ceramic electronic components, such as trimming capacitors and monolithic ceramic capacitors. The resulting component will also exhibit a high dielectric constant, high Q value, superior temperature characteristics and high volume resistivity.

EXAMPLES $SrCO_3$, $CaCO_3$, $Bi_2O_3$, $TiO_2$, $MgTiO_3$, $SiO_2$, $MnCO_3$, $CeO_2$, $La_2O_3$, $Pr_2O_3$, $Nd_2O_3$, $Sm_2O_3$, $Eu_2O_3$, $Gd_2O_3$, $Dy_2O_3$, $Ho_2O_3$, $Er_2O_3$, $Yb_2O_3$ and CuO were prepared as the starting materials for the primary and auxiliary components.

The materials were each weighed and mixed according to Table 1 to prepare sample mixtures. Predetermined amounts of CuO were contained in samples 41 to 43 as shown in Table 2. Each mixture was placed in a polyethylene pot containing zirconia balls and was pulverized by wet-mixing for 16 hours. The resulting pulverized mixture was dried by evaporation, placed in a zirconia casing, and calcined for 2 hours at 950° C.

TABLE 1

| | Primary Component | | | Auxiliary Component | | | | |
|---|---|---|---|---|---|---|---|---|
| Sample No. | a | b | n | w | x | y | Ln | z |
| *1 | 0.89 | 0.95 | 2.0 | 9.5 | 0.2 | 0.2 | Ce | 3.0 |
| 2 | 0.92 | 0.95 | 2.0 | 9.5 | 0.2 | 0.2 | Ce | 3.0 |
| *3 | 0.96 | 0.95 | 2.0 | 9.5 | 0.2 | 0.2 | Ce | 3.0 |
| *4 | 0.91 | 0.88 | 2.0 | 9.5 | 0.4 | 0.2 | Ce | 3.0 |
| 5 | 0.93 | 0.90 | 2.0 | 9.5 | 0.3 | 0.2 | Ce | 3.0 |
| 6 | 0.92 | 0.92 | 2.0 | 9.5 | 0.3 | 0.2 | Ce | 1.0 |
| 7 | 0.92 | 0.95 | 3.0 | 8.0 | 0.3 | 0.2 | Ce | 3.0 |
| *8 | 0.94 | 0.98 | 2.0 | 9.5 | 0.3 | 0.2 | Ce | 4.0 |
| *9 | 0.92 | 0.95 | 1.5 | 6.0 | 0.3 | 0.2 | Ce | 3.0 |
| 10 | 0.92 | 0.90 | 1.8 | 9.5 | 0.3 | 0.1 | Ce | 3.0 |
| 11 | 0.95 | 0.95 | 2.0 | 7.0 | 0.3 | 0.2 | Ce | 2.0 |
| 12 | 0.92 | 0.92 | 2.5 | 10.0 | 0.5 | 0.3 | Ce | 3.0 |
| 13 | 0.92 | 0.95 | 3.0 | 5.0 | 0.3 | 0.1 | Ce | 3.0 |
| *14 | 0.92 | 0.94 | 3.2 | 9.5 | 0.3 | 0.2 | Ce | 3.0 |
| *15 | 0.92 | 0.95 | 2.5 | 4.5 | 0.3 | 0.2 | Ce | 2.0 |
| 16 | 0.92 | 0.93 | 2.0 | 8.0 | 0.3 | 0.2 | Ce | 5.0 |
| *17 | 0.94 | 0.95 | 2.0 | 10.5 | 0.3 | 0.2 | Ce | 4.0 |
| *18 | 0.92 | 0.92 | 2.0 | 12.0 | 0.3 | 0.1 | Ce | 3.0 |

TABLE 1-continued

| | Primary Component | | | Auxiliary Component | | | | |
|---|---|---|---|---|---|---|---|---|
| Sample No. | a | b | n | w | x | y | Ln | z |
| *19 | 0.92 | 0.95 | 3.0 | 7.0 | 0.0 | 0.2 | Ce | 3.0 |
| 20 | 0.92 | 0.95 | 3.0 | 8.0 | 0.1 | 0.2 | Ce | 3.0 |
| *21 | 0.93 | 0.95 | 2.0 | 9.0 | 1.1 | 0.2 | Ce | 3.0 |
| *22 | 0.92 | 0.93 | 2.0 | 9.5 | 1.5 | 0.2 | Ce | 1.0 |
| *23 | 0.91 | 0.95 | 2.0 | 9.5 | 0.3 | 0.0 | Ce | 3.0 |
| 24 | 0.91 | 0.95 | 2.0 | 9.5 | 0.3 | 0.1 | Ce | 2.0 |
| *25 | 0.92 | 0.95 | 3.0 | 8.0 | 0.3 | 0.4 | Ce | 3.0 |
| *26 | 0.92 | 0.94 | 2.0 | 9.5 | 0.2 | 0.5 | Ce | 3.0 |
| *27 | 0.94 | 0.95 | 2.0 | 6.0 | 0.3 | 0.2 | Ce | 0.0 |
| 28 | 0.92 | 0.95 | 2.5 | 7.0 | 0.3 | 0.2 | Ce | 2.0 |
| *29 | 0.92 | 0.93 | 2.0 | 9.5 | 0.4 | 0.2 | Ce | 6.0 |
| *30 | 0.92 | 0.95 | 3.0 | 9.5 | 0.1 | 0.2 | Ce | 7.0 |
| 31 | 0.92 | 0.95 | 2.5 | 7.0 | 0.3 | 0.2 | La | 2.0 |
| 32 | 0.92 | 0.95 | 2.5 | 7.0 | 0.3 | 0.2 | Pr | 2.0 |
| 33 | 0.92 | 0.95 | 2.5 | 7.0 | 0.3 | 0.2 | Nd | 2.0 |
| 34 | 0.92 | 0.95 | 2.5 | 7.0 | 0.3 | 0.2 | Sm | 2.0 |
| 35 | 0.92 | 0.95 | 2.5 | 7.0 | 0.3 | 0.2 | Eu | 2.0 |
| 36 | 0.92 | 0.95 | 2.5 | 7.0 | 0.3 | 0.2 | Gd | 2.0 |
| 37 | 0.92 | 0.95 | 2.5 | 7.0 | 0.3 | 0.2 | Dy | 2.0 |
| 38 | 0.92 | 0.95 | 2.5 | 7.0 | 0.3 | 0.2 | Ho | 2.0 |
| 39 | 0.92 | 0.95 | 2.5 | 7.0 | 0.3 | 0.2 | Er | 2.0 |
| *40 | 0.92 | 0.95 | 2.5 | 7.0 | 0.3 | 0.2 | Yb | 2.0 |

TABLE 2

| | Primary Component | | | Auxiliary Component | | | | | |
|---|---|---|---|---|---|---|---|---|---|
| Sample No. | a | b | n | w | x | y | Ln | z | CuO |
| *41 | 0.92 | 0.95 | 2.0 | 9.5 | 0.2 | 0.2 | Ce | 3.0 | 0.5 |
| *42 | 0.92 | 0.92 | 2.0 | 9.5 | 0.3 | 0.2 | Ce | 3.0 | 0.3 |
| *43 | 0.92 | 0.95 | 3.0 | 8 | 0.1 | 0.2 | Ce | 3.0 | 0.8 |

Next, the calcined mixture was mixed with a polyvinyl alcohol binder and wet-mixed in a polyethylene pot for 16 hours. The resulting mixture was dried by dehydration, sized, and compressed into a disk-shaped green compact having a diameter of 12 mm and a thickness of 1.2 mm. The green compact was baked at 1,220° C. for 2 hours to prepare a ceramic compact. Electrodes were formed on both faces of the ceramic compact by baking the paste applied thereto at 800° C. to prepare a capacitor sample.

The characteristics of each sample was determined according to the following conditions and methods:

Dielectric constant: 1 MHz, 1 Vrms, at 20° C.;

Q value: 1 MHz, 1 Vrms, a reciprocal of dielectric loss at 20° C.; and

Temperature coefficient: the maximum rate of change in dielectric constant in the range of −25° C. to 85° C. based on the dielectric constant at +20° C.

The results are shown in Tables 3 and 4.

TABLE 3

| Sample No. | Dielectric constant $\epsilon$ | Q value | Temperature coefficient [ppm/° C.] | Volume resistivity $\rho$ [$\Omega \cdot cm$] |
|---|---|---|---|---|
| *1 | 650 | 847 | −1750 | $4.5 \times 10^{14}$ |
| 2 | 544 | 1140 | −1990 | $3.8 \times 10^{14}$ |
| *3 | 435 | 2540 | −2330 | $8.7 \times 10^{14}$ |
| *4 | 568 | 875 | −1540 | $5.2 \times 10^{14}$ |
| 5 | 574 | 1050 | −1760 | $1.4 \times 10^{14}$ |
| 6 | 532 | 1210 | −1790 | $2.5 \times 10^{14}$ |

TABLE 3-continued

| Sample No. | Dielectric constant ε | Q value | Temperature coefficient [ppm/° C.] | Volume resistivity ρ [Ω · cm] |
|---|---|---|---|---|
| 7 | 572 | 1080 | −1960 | 3.5 × 10$^{14}$ |
| *8 | 578 | 1260 | −2080 | 7.2 × 10$^{14}$ |
| *9 | 486 | 1450 | −1990 | 3.6 × 10$^{14}$ |
| 10 | 514 | 1380 | −1880 | 5.2 × 10$^{14}$ |
| 11 | 524 | 1250 | −1850 | 4.8 × 10$^{14}$ |
| 12 | 536 | 1150 | −1800 | 2.8 × 10$^{14}$ |
| 13 | 558 | 1030 | −1710 | 7.5 × 10$^{14}$ |
| *14 | 565 | 935 | −1660 | 8.9 × 10$^{14}$ |
| *15 | 542 | 3520 | −2160 | 4.2 × 10$^{14}$ |
| 16 | 564 | 1450 | −1990 | 2.8 × 10$^{14}$ |
| *17 | 535 | 761 | −1850 | 5.6 × 10$^{14}$ |
| *18 | 514 | 518 | −1760 | 4.5 × 10$^{14}$ |
| *19 | 576 | 1060 | −2070 | 8.5 × 10$^{14}$ |
| 20 | 584 | 1040 | −1850 | 4.2 × 10$^{14}$ |
| *21 | 543 | 985 | −1750 | 3.8 × 10$^{14}$ |
| *22 | 557 | 854 | −1670 | 8.2 × 10$^{14}$ |
| *23 | 587 | 1060 | −2110 | 6.5 × 10$^{14}$ |
| 24 | 542 | 1100 | −1950 | 5.4 × 10$^{14}$ |
| *25 | 486 | 1120 | −1870 | 2.6 × 10$^{14}$ |
| *26 | 452 | 1150 | −1850 | 7.8 × 10$^{14}$ |
| *27 | 752 | 587 | −2050 | 2.5 × 10$^{14}$ |
| 28 | 587 | 1060 | −1850 | 5.8 × 10$^{14}$ |
| *29 | 485 | 1330 | −1680 | 7.1 × 10$^{14}$ |
| *30 | 389 | 1560 | −1460 | 3.6 × 10$^{14}$ |
| 31 | 602 | 1420 | −1480 | 4.7 × 10$^{14}$ |
| 32 | 584 | 1510 | −1450 | 2.5 × 10$^{14}$ |
| 33 | 578 | 1520 | −1470 | 7.8 × 10$^{14}$ |
| 34 | 572 | 1510 | −1430 | 2.8 × 10$^{14}$ |
| 35 | 564 | 1570 | −1420 | 3.6 × 10$^{14}$ |
| 36 | 550 | 1530 | −1430 | 4.8 × 10$^{14}$ |
| 37 | 538 | 1570 | −1410 | 8.6 × 10$^{14}$ |
| 38 | 542 | 1540 | −1430 | 1.5 × 10$^{14}$ |
| 39 | 515 | 1550 | −1440 | 5.6 × 10$^{14}$ |
| *40 | 495 | 1520 | −1430 | 4.8 × 10$^{14}$ |

TABLE 4

| Sample No. | Dielectric constant ε | Q value | Temperature Coefficient [ppm/° C.] | Volume resistivity ρ [Ω · cm] |
|---|---|---|---|---|
| *41 | 538 | 1250 | −1980 | 5.2 × 10$^{13}$ |
| *42 | 557 | 1100 | −1840 | 4.2 × 10$^{13}$ |
| *43 | 565 | 1180 | −1940 | 4.8 × 10$^{13}$ |

In Tables 1 to 4, the asterisked samples are outside the scope of the present invention and samples without asterisks are within the scope of the present invention. In particular, the samples shown in Tables 2 and 4 contained CuO and are outside the scope of the present invention. As is apparent from Tables 1 to 4, the composition of the present invention is limited based on the following reasons:

(1) At a $Bi_2O_3$ content 1−a exceeding 0.1, the Q value becomes less than about 1,000 (Sample 1). At a $Bi_2O_3$ content 1−a less than 0.05, the dielectric constant becomes less than 500 and the temperature coefficient becomes less than −2,000 ppm/° C. (Sample 3).

(2) At a $SrTiO_3$ content b less than 0.9, the Q value becomes less than about 1,000 (Sample 4). At a $SrTiO_3$ content b exceeding 0.95, the temperature coefficient becomes less than −2,000 ppm/° C. (Sample 8).

(3) When the molar ratio n of $TiO_2$ to $Bi_2O_3$ is less than 1.8, the dielectric constant becomes less than 500 (Sample 9). When n exceeds 3, the Q value becomes less than about 1,000 (Sample 14).

(4) At a $MgTiO_3$ content w less than 5, the temperature coefficient becomes lower than −2,000 ppm/° C. (Sample 15). At w exceeding 10, the Q value becomes less than about 1,000 (Samples 17 and 18).

(5) At a $SiO_2$ content x less than 0.1, the temperature coefficient becomes lower than −2,000 ppm/° C. (Sample 19). At x exceeding 1.0, the Q value becomes less than about 1,000 (Samples 21 and 22).

(6) When the $MnO_m$ content y (m=1 to 2, $MnCO_3$ equivalent) is less than 0.1, the temperature coefficient becomes lower than −2,000 ppm/° C. (Sample 23). With y exceeding 0.3, the dielectric coefficient becomes less than 500 (Samples 25 and 26).

(7) At a $LnO_k$ content z less than 1.0, the Q value becomes less than about 1,000, and the temperature coefficient becomes lower than −2,000 ppm/° C. (Sample 27). At z exceeding 5.0, the dielectric coefficient becomes less than 500 (Samples 29 and 30).

(8) When Ln is other than the elements described above, the dielectric coefficient becomes less than 500 (Sample 40).

(9) Samples containing CuO have a volume resistivity lower than 10$^{14}$ Ω·cm (Samples 41 to 43).

What is claimed is:

1. A dielectric ceramic composition comprising:

100 parts by weight of a primary component represented by the general formula $a[(Sr_bCa_{1-b})TiO_3]\cdot(1-a)[Bi_2O_3 \cdot nTiO_2]$ wherein a and b are each moles n is the molar ratio of $TiO_2$ to $Bi_2O_3$;

w parts by weight of $MgTiO_3$;

x parts by weight of $SiO_2$;

y parts by weight of $MnO_m$ (calculated as equivalents of $MnCO_3$); and z parts by weight of $LnO_k$, wherein m is 1 to 2; Ln is at least one of lanthanum, cerium, praseodymium, neodymium, samarium, europium, gadolinium, dysprosium, holmium and erbium; and k is in the range of 1.5 to 2 such that $LnO_k$ is electroneutral, wherein a, b, n, w, x, y and z satisfy the following conditions:

$0.90 \leq a \leq 0.95$, $0.90 \leq b \leq 0.95$, $1.8 \leq n \leq 3.0$, $5.0 \leq w \leq 10.0$, $0.1 \leq x \leq 1.0$, $0.1 \leq y \leq 0.3$, and $1.0 \leq z \leq 5.0$.

2. A dielectric ceramic composition according to claim 1, wherein $0.91 \leq a \leq 0.95$, $0.92 \leq b \leq 0.95$, $1.8 \leq n \leq 2.5$, $7.0 \leq w \leq 9.5$, $0.2 \leq x \leq 0.5$, and $2.0 \leq z \leq 3.0$.

3. A dielectric ceramic composition according to claim 2, wherein Ln is cerium.

4. A dielectric ceramic composition according to claim 2, wherein the composition contains no Cu.

5. A dielectric ceramic composition according to claim 1, wherein Ln is cerium.

6. A dielectric ceramic composition according to claim 5, wherein $0.92 \leq a \leq 0.95$.

7. A ceramic electronic component comprising;
a ceramic sintered compact comprising the dielectric ceramic composition of claim 5; and
an electrode on a surface of the ceramic sintered compact.

8. A ceramic electronic component comprising;
a ceramic sintered compact comprising the dielectric ceramic composition of claim 6; and
an electrode on a surface of the ceramic sintered compact.

9. A ceramic electronic component comprising;
a ceramic sintered compact comprising the dielectric ceramic composition of claim 4; and
an electrode on a surface of the ceramic sintered compact.

10. A ceramic electronic component comprising;
a ceramic sintered compact comprising the dielectric ceramic composition of claim 3; and
an electrode on a surface of the ceramic sintered compact.

11. A ceramic electronic component comprising;
a ceramic sintered compact comprising the dielectric ceramic composition of claim 2; and
an electrode on a surface of the ceramic sintered compact.

12. A ceramic electronic component comprising;
a ceramic sintered compact comprising the dielectric ceramic composition of claim 1; and
an electrode on a surface of the ceramic sintered compact.

* * * * *